(12) United States Patent
Kilibarda et al.

(10) Patent No.: US 8,818,531 B2
(45) Date of Patent: Aug. 26, 2014

(54) DISTRIBUTED CONTROL SYSTEM

(75) Inventors: Velibor Kilibarda, Birmingham, MI (US); David Wang, Northville, MI (US)

(73) Assignee: COMAU, Inc., Southfiled, MI (US)

( * ) Notice: Subject to any disclaimer, the term of this patent is extended or adjusted under 35 U.S.C. 154(b) by 293 days.

(21) Appl. No.: 13/005,099

(22) Filed: Jan. 12, 2011

(65) Prior Publication Data

US 2011/0172788 A1 Jul. 14, 2011

Related U.S. Application Data

(60) Provisional application No. 61/294,265, filed on Jan. 12, 2010.

(51) Int. Cl.
*G06F 19/00* (2011.01)
*G05B 19/418* (2006.01)

(52) U.S. Cl.
CPC *G05B 19/41815* (2013.01); *G05B 2219/33273* (2013.01)
USPC .................................. 700/19; 700/20; 700/52

(58) Field of Classification Search
USPC ............................................... 700/19, 20, 52
See application file for complete search history.

(56) References Cited

U.S. PATENT DOCUMENTS

| | | |
|---|---|---|
| 4,888,692 A | 12/1989 | Gupta et al. |
| 5,757,648 A | 5/1998 | Nakamura |
| 6,185,466 B1 | 2/2001 | Nicewonger |
| 6,330,493 B1 | 12/2001 | Takahashi et al. |
| 6,401,011 B1 | 6/2002 | Hashimukai |
| 6,507,765 B1 * | 1/2003 | Hopkins et al. ................. 700/95 |
| 6,556,891 B2 | 4/2003 | Hietmann et al. |
| 6,782,294 B2 | 8/2004 | Reich et al. |
| 6,804,580 B1 | 10/2004 | Stoddard et al. |
| 6,807,461 B2 | 10/2004 | Kneifel, II et al. |
| 7,149,606 B2 | 12/2006 | Krause |
| 7,209,859 B2 * | 4/2007 | Zeif .............................. 702/182 |
| 7,321,808 B2 | 1/2008 | Nagamatsu |
| 7,330,777 B2 | 2/2008 | Hashimoto et al. |
| 7,343,222 B2 | 3/2008 | Solomon |
| 2002/0111702 A1 | 8/2002 | Angel |
| 2004/0085561 A1 | 5/2004 | Fromherz |
| 2006/0101465 A1 | 5/2006 | Kato et al. |
| 2006/0217842 A1 | 9/2006 | Kobayashi et al. |

(Continued)

FOREIGN PATENT DOCUMENTS

DE 10 2007 039 425 A1 2/2009
WO 2005001699 A2 1/2005

OTHER PUBLICATIONS

Notification of Transmittal, International Search Report and Written Opinion of the International Searching Authority dated Aug. 8, 2011 from the corresponding International Application No. PCT/US2011/020936 filed Jan. 12, 2011.

*Primary Examiner* — Michael D Masinick
(74) *Attorney, Agent, or Firm* — Young Basile Hanlon & MacFarland P.C.

(57) ABSTRACT

Disclosed is a method for controlling a plurality of machines. The method includes identifying a first prerequisite operating condition for a first machine in the plurality of machines, the first machine having at least one control unit and configured to perform at least a first operation, obtaining at least one current operating condition corresponding to a second machine in the plurality of machines and if the at least one current operating condition meets the first prerequisite operating condition, performing the first operation.

13 Claims, 3 Drawing Sheets

(56) References Cited

U.S. PATENT DOCUMENTS

| | | |
|---|---|---|
| 2006/0282182 A1 | 12/2006 | Da Silva Neto |
| 2008/0009969 A1 | 1/2008 | Bruemmer et al. |
| 2008/0234861 A1 | 9/2008 | Fortell et al. |
| 2008/0269949 A1 | 10/2008 | Norman et al. |
| 2009/0210081 A1 | 8/2009 | Sustaeta et al. |
| 2010/0211201 A1 | 8/2010 | Papenfort et al. |

\* cited by examiner

DISTRIBUTED CONTROL SYSTEM

CROSS-REFERENCE TO RELATED APPLICATIONS

This application claims priority to U.S. Provisional Patent Application No. 61/294,265, filed Jan. 12, 2010, which is incorporated herein by reference in its entirety.

FIELD OF THE INVENTION

The present invention pertains to controlling multiple cooperative machines, such as machinery in an automated manufacturing plant.

BACKGROUND

Automated machinery is becoming increasingly common in many environments. Many modern factories and manufacturing plants include automated machinery to manufacture or process goods. Such automated machinery can include a wide range of machines, such as robots, conveyors, clamps, pins, welders and other machines. Automated machinery can also be used in environments other than factories and manufacturing plants. For example, car washes can use automated brushes and sprayers to wash cars.

Automated machinery typically requires various operations to be performed in a specific order. To increase the efficiency of automated machinery, the time between many operations should be as small as possible. As a result, various methods have been developed for machines to perform operations in a specific order while also attempting to minimize the time between operations.

An early method of minimizing the time between operations includes timing the machinery to perform each operation at a specific time. For example, if performance of a second operation requires that performance of a first operation be complete, one can determine when each cycle of the first operation will be complete. One can then time cycles of the second operation to begin almost immediately after each cycle of the first operation is complete. However, controlling the performance of various operations on the sole basis of time can have drawbacks. For example, if the first operation is not complete at its normal time due to a machine defect or some other malfunction, the second operation may still be attempted after the expected completion time of the first operation.

A more modern method includes using analog sensors to determine the status of at least some of the various operations performed by the machinery. The machinery can include multiple individual machines, and each individual machine can include one of the analog sensors. A central control center, e.g., a computer, can receive signals from the sensors by connecting respective output lines from the sensors to the central control center, and the central control center can also control each individual machine by connecting each machine to the central control center with respective input lines. For example, an analog sensor for determining whether a pneumatic clamp is open or closed can be coupled to a central control center via an output line, and a pressure source for operating the clamp can be coupled to the central control center via an input line for controlling operation of the clamp.

The central control center can thus determine the status of each individual machine (and thus each individual operation), and the control center can thereby determine whether a first operation is complete before instructing the next machine to perform a second operation. Returning to the above example involving the pneumatic clamp, if the clamp is used to hold a component while a welding operation is performed, the control center can receive a signal indicating that the welding operation is complete. After receiving this signal, the central control center can cycle through a check of all signals, can determine that the conditions for operating the clamp have been met, and can provide an input signal to the pressure source, causing the pressure source to provide pressure to or release pressure from the pneumatic clamp. The pneumatic clamp, in turn, can open to release the component, and its analog sensor can output a signal to the central control center indicating that the clamp is open. The central control center can then cycle through a check of all operations to determine that the welding operation and the clamping step are complete, and can instruct another machine to perform the next operation.

SUMMARY

Embodiments of a method for controlling a plurality of machines are disclosed herein. In one embodiment, the method includes identifying a first prerequisite operating condition for a first machine in the plurality of machines, the first machine having at least one control unit and configured to perform at least a first operation. The method also includes obtaining at least one current operating condition corresponding to a second machine in the plurality of machines. The method includes performing the first operation if the at least one current operating condition meets the first prerequisite operating condition.

Embodiments of a method of distributed control of a plurality of machines with each machine of the plurality of machines having at least one control unit are also disclosed herein. In one embodiment, the method includes identifying a first prerequisite operating condition for a first operation of a first machine having a first control unit and identifying a second prerequisite operating condition for a second operation of a second machine having a second control unit. The method also includes obtaining at least a first and a second current operating condition from at least one other control unit. Further, the method includes performing the first operation if the first prerequisite operating condition is met by the at least one first current operating condition and performing the second operation if the second prerequisite operating condition is met by the at least one second current operating condition.

Embodiments of an apparatus in a first machine for controlling a plurality of machines, the first machine configured to perform at least a first operation are also disclosed herein. In one embodiment, the apparatus includes a memory and a processor configured to execute instructions stored in the memory to identify a first prerequisite operating condition for the first machine and obtain at least one current operating condition corresponding to a second machine in the plurality of machines. The processor is also configured to execute instructions stored in the memory to generate a signal to perform the first operation if the at least one current operating condition meets the first prerequisite operating condition.

These and other embodiments will be described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
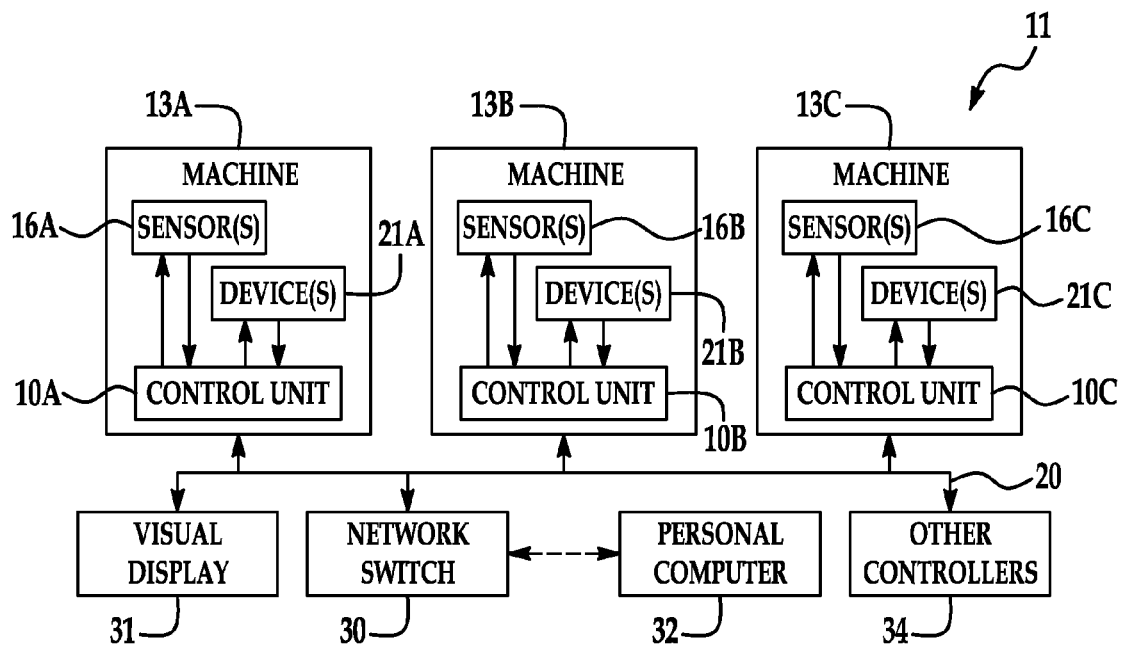
FIG. 1 is a schematic view of an example of a distributed control system.

FIG. 1 shows a distributed control system 11 for controlling multiple machines 13a, 13b and 13c (referred to collectively as "machines 13"). Each of machines 13 includes at least one control unit, such as control units 10a, 10b and 10c (referred to collectively as "control units 10"), can include one or more sensors, such as sensors 16a, 16b and 16c (referred to collectively as "sensors 16") and can include one or more devices, such as devices 21a, 21b, and 21c (referred to collectively as "devices 21").

The machines 13 can be any machines that perform coordinated operations, such as automated machines in a manufacturing plant or automated machines in a car wash. While three machines 13 are shown in FIG. 1, in practice the number of machines can vary and may be less than or exceed three. As an example that is used in this application, machine 13a can be a pneumatic clamp, machine 13b can be a welding robot, and machine 13c can be a conveyor.

The control units 10 of machines 13 can be connected to a network switch 30 using lines 20. The lines 20 can be powerline communication lines, for example, of the type in conformity with one of the various Ethernet-over-powerline standards, such as one of the standards promoted by the HomePlug Power Alliance or the Universal Powerline Association. Thus, the lines 20 may provide both power and means for communication to the control units 10. Another method of providing both power and network connectivity to machines 13 can be using a Power over Ethernet (PoE) implementation, for example, those in conformity with standards promoted by the IEEE.

Alternatively, other structures for powering and communicating with each of the control units 10 can be used, such as a dedicated power line (e.g., a conventional power wire) and a separate, dedicated communication line (e.g., an Ethernet cable) for communication with the network switch 30. As another example, each control unit 10 can communicate wirelessly with the network switch 30 via inclusion of a wireless device (e.g., a Wi-Fi card) with the control unit 10.

Since each control unit 10 can be connected to the network switch 30, an Ethernet local area network (LAN) can be formed for communication between control units 10. Alternatively, if wireless communication is used instead of the lines 20, a Wi-Fi LAN or other type of network can be formed. Thus, the network switch 30 can route a communication generated by one of the control units 10 to another control unit 10. Instead of the network switch 30, another networking device, such as a router, or a combination of networking devices can alternatively be used.

Figure 2:
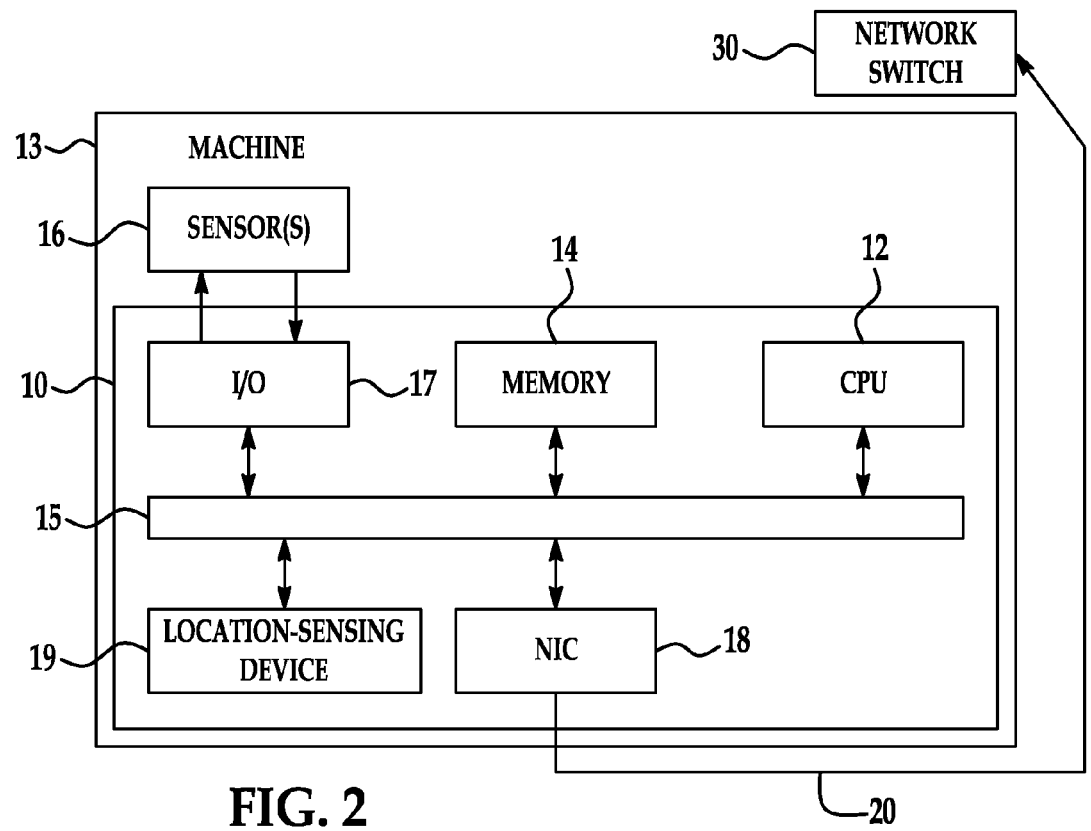
FIG. 2 is a schematic view of an example of a machine having a control unit.

As shown in FIG. 2, each control unit 10 can include a CPU 12, a memory 14, a bus 15, an input/output (I/O) device 17, a network interface card (NIC) 18, and a location-sensing device 19. The control unit 10 can also include other components, such as an RFID chip, and the control unit 10 need not necessarily include each of the illustrated components (e.g., the control unit 10 need not necessarily include the GPS receiver 19). The bus 15 can connect the CPU 12, memory 14, the I/0 device 17, NIC 18 and location-sensing device 19.

The CPU 12 can be, for example, a microprocessor, a computer-on-a-chip or another type of CPU. The CPU 12 can perform calculations (e.g., algorithms stored on the memory 14), control components of the control unit 10, and perform other operations.

The location-sensing device 19 can be, for example, a GPS receiver. Alternately, the location-sensing device may use other methods of sensing location. For example, the location-sensing device may use wireless triangulation to locate the machine's location in, for example, a manufacturing plant. Other methods of determining a machine's location are also possible.

Figure 3:
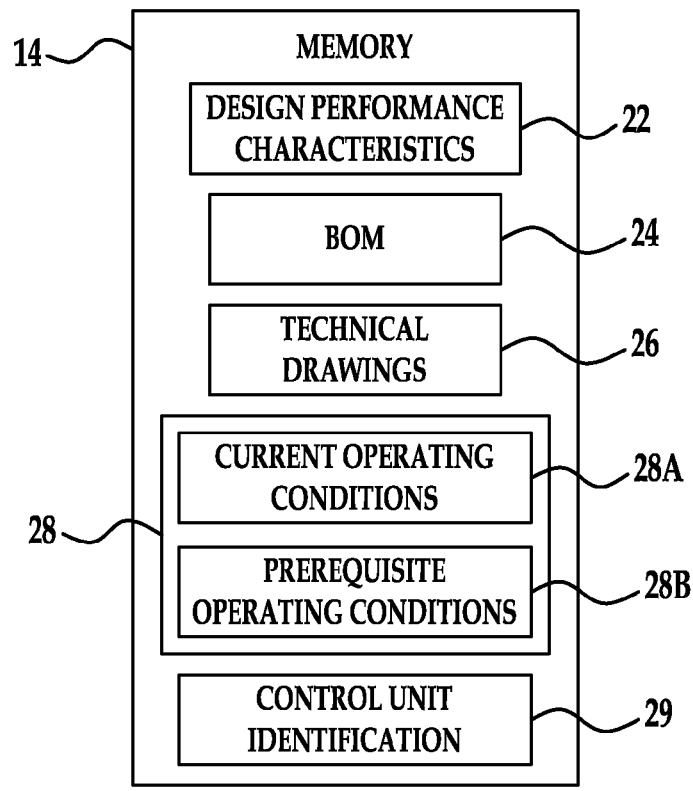
FIG. 3 is a schematic view of a memory portion of the control unit of FIG. 2 or other external storage device.

The memory 14 can be RAM, EEPROM, or another type of memory. As shown in FIG. 3, the memory 14 can be used to store information pertaining to one or more of the machines 13, such as design performance characteristics 22, a bill of materials (BOM) 24, technical drawings 26 and operating conditions 28 for the machine 13. The operating condition(s) 28 can include current operating condition(s) 28a and prerequisite operating condition(s) 28b. The current operating conditions 28a of the machine 13 includes the current state of the machine 13. The current operating conditions 28a may also include indications of previous states of the machine 13. The prerequisite operating conditions 28b may include any condition precedent for any operation to be performed by machine 13. The memory 14 can additionally store other information, such as programs or algorithms executed by the CPU 12. The memory 14 can also store a control unit identification 29 that can be used to identify the control unit 10 to other nodes on the network, including other control device(s), visual display(s) 31, and personal computer(s) 32.

Referring back to FIG. 2, an input connection of the I/O device 17 can be in communication with one or more sensors 16, and an output connection of the I/O device 17 can be in communication with one or more of the devices 21. For example, the I/O device 17 can be connected by wiring to one or more sensors 16 and to one or more devices 21. As a result, the I/O device 17 can relay information from one or more sensors 16 to the CPU 12, and it can also output an instruction from the control unit 10 to one or more devices 21.

The NIC 18 can connect to the line 20 for communication between the control unit 10 and the network switch 30, though the NIC 18 can alternatively be capable of wireless communication with the network switch 30. Thus, the NIC 18, operating in conjunction with the lines 20 and the network switch 30, can allow each control unit 10 to communicate with other control units 10.

As an example of communication between control units 10 of the machines 13, the CPU 12 of one of the control units 10 can convert input from one of its sensors 16 into XML format, and the CPU 12 can instruct the NIC 18 to output the XML message to another control unit 10 via the network switch 30. The receiving control unit 10 can then read the XML message and, if warranted, instruct its one or more devices 21 to perform an operation. Additionally, a control unit 10 can instruct its NIC 18 to output the XML message to a visual display device 31 within the network that is directly or indirectly connected.

Referring again to FIG. 1, the one or more sensors 16 can include analog sensors and/or digital sensors. Digital sensors can be useful due to their ability to provide more precise information than analog sensors. The sensors 16 can include, e.g., a position sensor, an acceleration sensor, a pressure sensor, a temperature sensor, a light sensor, an electrical sensor and/or other types of sensors. The specific type of sensors 16 used can depend on the type of machine whose operation is sensed, and multiple types of sensors 16 can be used for a single machine.

For example, if machine 13a is the pneumatic clamp, its sensor 16a can include a digital position sensor for determining the degree that the clamp is open. If machine 13b is the welding robot, its sensors 16b can include position sensors for determining the position of the robot (e.g., multiple position sensors may be used to determine the position of the robot in three dimension if the robot is independently moveable in different dimensions), as well as another sensor for determining whether the robot is performing a welding operation, such as a temperature sensor or electrical sensor. If machine 13c is a conveyor, its sensors 16c can include a position sensor. The sensors 16 can thus detect the status of the machines 13 and output the status to the control units 10.

The one or more devices 21 can include any type of mechanical, electro-mechanical, or electronic device that performs an operation. For example, devices 21 can include a hydraulic valve device 21a for controlling the pneumatic clamp 13a, a servo motor device 21b for controlling the robot 13b, and an electric motor device 21c for controlling the conveyor 13c. The specific types of devices 21 used can depend on the type of machine 13 that the devices are used within. Additionally, multiple devices may be used within a machine. For example, a robot can have a plurality of servo motors. In some instances, a device may contemporaneously have a sensor. For example, a servo motor may include both a means for moving a robot, but may also include a sensor of the position of the servo motor. In some embodiments, one or more machines may not include any device 21.

Figure 4:
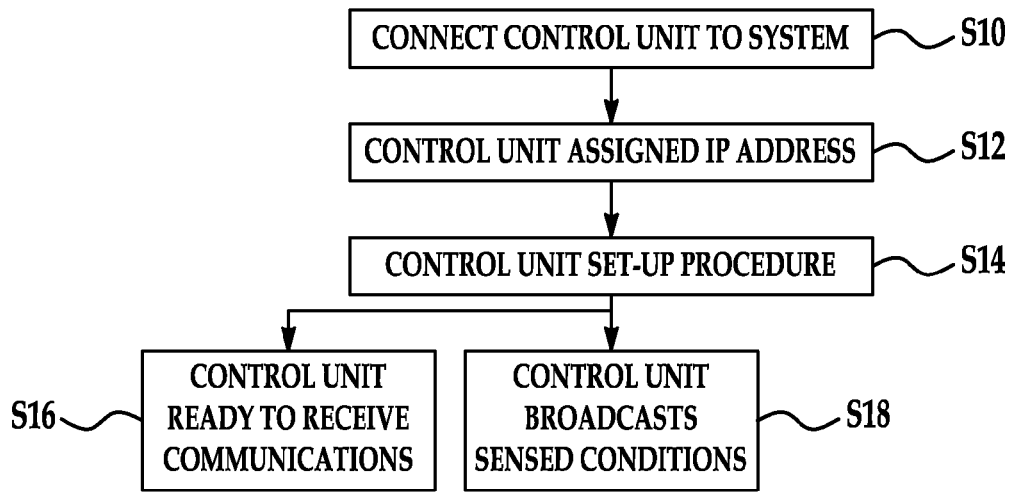
FIG. 4 is a block diagram of examples of functional aspects of the control unit of FIG. 2.

As shown in FIG. 4, after connecting a control unit 10 of a machine 13 to the system 11 as shown in step S10 (for example, by plugging the line 20 into the NIC 18), the control unit 10 can be assigned an IP address (e.g., an IPv6 address) as shown in step S12 by a device on the LAN, such as a DHCP server. As shown in step S14, a set-up procedure can then be initiated. The set-up procedure can include the control unit 10 obtaining the design performance characteristics 22 of its machine 13 by having one or more sensors 16 monitor the machine 13 during performance of its operation. The set-up procedure can also include inputting the prerequisite operating conditions 28b to the control unit 10 by requesting a user to place the operation performed by the machine 13 controlled by the control unit 10 into a sequence of operations, and the procedure can also include requesting the user to indicate which preceding operations are prerequisite operating conditions 28b. Alternatively, the set-up procedure can be performed in another manner, such as by programming the design performance characteristics 22 and prerequisite operating conditions 28b into the control unit 10 before installation.

Once installed and set-up, the control unit 10 can receive (e.g. current operating conditions 28a) output by other control units 10 as shown in step S16. The control unit 10 can also broadcast its status (e.g. current operating condition 28a), such as whether or not it is currently operating, what stage the operation of its machine 13 is currently at, and if the operation of its machine 13 has been completed, as shown in step S18.

Figure 5:
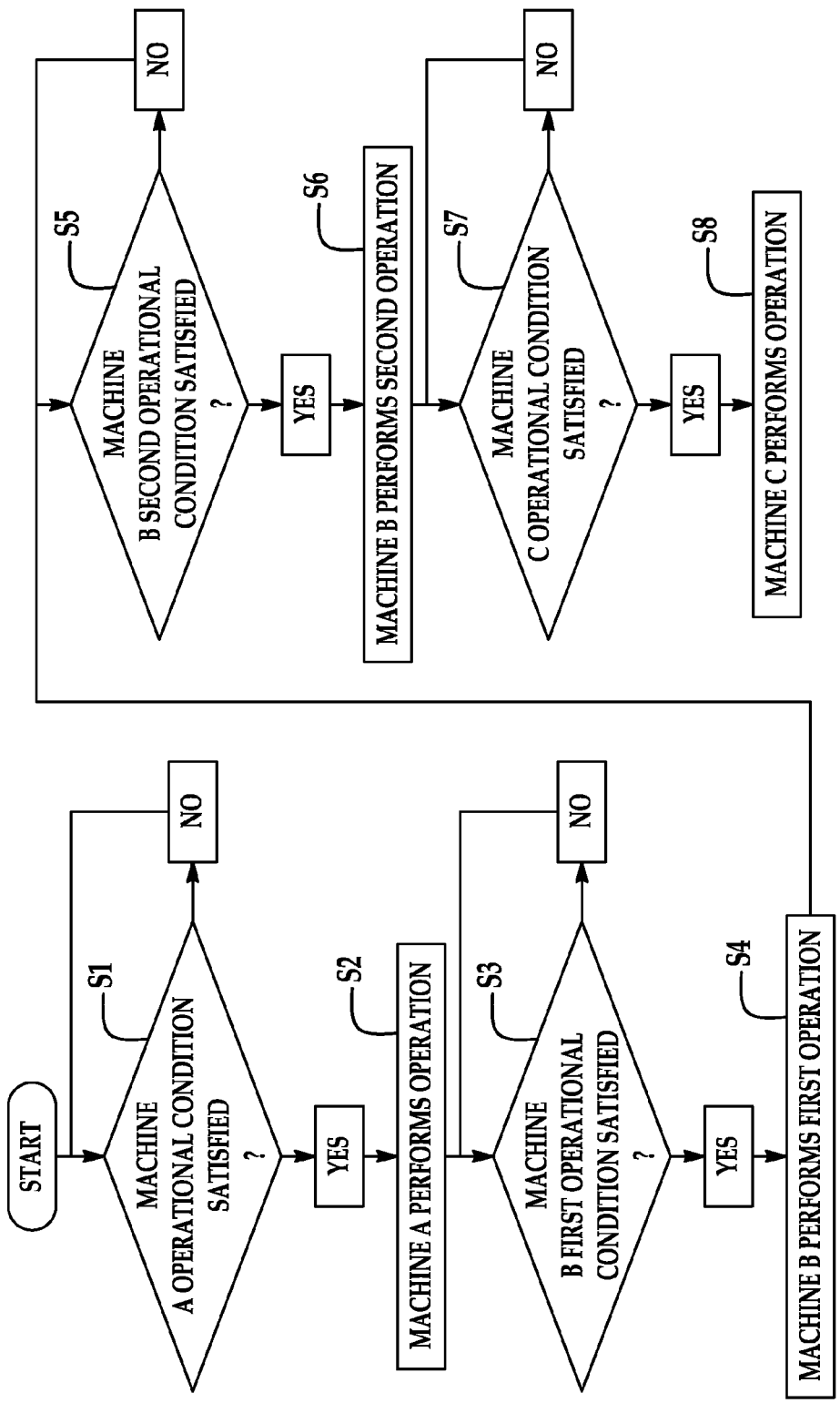
FIG. 5 is a block diagram of exemplary logic utilized by the control unit of FIG. 2.

As can be understood from FIG. 5, each control unit 10 controls its machine 13 based on signals received by the machine's own sensor(s) 16 and/or by signals routed through the network switch 30 to the control unit 10 from one or more of the other controls units 10. That is, control unit 10a can continuously monitor signals on the system 11 to determine whether its prerequisite operating conditions 28b have been met as shown in step S1. Once control unit 10a receives a signal indicating that its prerequisite operating conditions 28b have been met, control unit 10a can instruct device 21a of machine 13a to perform its operation as shown in step S2. Control unit 10a can then monitor the performance of machine 13a and/or device 21a using sensor 16a. Control unit 10a can continuously output the current operating conditions 28a of machine 13a, and control unit 10a can alternatively or additionally output its current operating conditions 28a once machine 13a has completed its operation. Current operating conditions 28a output by control unit 10a can be routed to control unit 10b via lines 20 and network switch 30.

Still referring to FIG. 5, one of the prerequisite operating conditions 28b of control unit 10b can be that control unit 10a has successfully performed one or more operations. The control unit 10b can also include a second prerequisite operation condition 28b requiring that its own machine 13b successfully perform one or more operations. Thus, control unit 10b can continuously monitor signals on the system 11, as well as signals from its sensor(s) 16b to determine whether its prerequisite operating conditions 28b have been met as shown in step S3. Once control unit 10b receives the signal output by the control unit 10a indicating that the first operating condition 28b of control unit 10b has been met, control unit 10b can instruct device 21b of machine 13b to perform a first operation as shown in step S4.

Control unit 10b can then monitor the performance of machine 13b using sensor 16b as shown in step S5. Control unit 10b can continuously output the operational status of machine 13b, and control unit 10b can alternatively or additionally output a signal once machine 13b has performed its specific operation. However, since machine 13b in this example has a second operation to perform, control unit 10b can instruct device 21b of machine 13b to perform the second operation as shown in step S6 once control unit 10b determines that the first operation was successfully completed. Control unit 10b can then monitor the progress of the second operation in the same fashion as it monitored the status of the first operation, and control unit 10b can output current operating conditions 28a accordingly. Current operating conditions 28a output by control unit 10b can be sent to control unit 10c via lines 20 and network switch 30.

Also as shown in FIG. 5, once control unit 10c receives signals that all of its prerequisite conditions 28b have been met (e.g., that machine 13b has performed its operations) as shown in step S7, control unit 10c can instruct device 21c of machine 13c to perform its operation as shown in step S8. While FIG. 5 shows three machines 13, the process can include additional machines if more machines are present. Additionally, variations on the described process are possible. For example, machine 13c can have prerequisite operating conditions 28a including operations being successfully performed by both machine 13a and machine 13b, and control unit 10c can therefore receive signals output by both control units 10a and 10b. Further, machine 13a can have as a prerequisite operating condition 28a that machine 13b successfully perform an operation. The control units can work in synchronous or asynchronous operation(s).

Thus, the system 11 as described herein allows one control unit 10 to communicate directly to another control unit 10 via a LAN. In contrast to known systems which each include a central control center that must cycle through a time and computing resource consuming check of the statuses of all its sensors, the system 11 permits communication directly between control units 10. Since each control unit 10 can keep track of whether or not its own prerequisite operating conditions 28a have been met, the system 11 can operate faster with less computing power than known systems.

In addition, the control units 10 can communicate to other controllers 34 such as a robotic controller, weld controller, motion controller, etc. The various controllers are in communication with the control units 10 to perform work in synchronous or asynchronous operation.

Further, the ability to use digital sensors allows the control units 10 to determine with greater precision the status of the machines 13, while known systems typically use analog sensors that can only indicate one of two states of a machine.

In addition to allowing for communication between control units 10, the system 11 can perform other functions. For example, the design performance characteristics 22 of one of the machines 13 can be used to determine whether that machine 13 has properly performed an operation. For example, the position or other characteristic of one of the machines 13 or devices 21 of the machines 13 detected by its sensor 16 can be compared to the design performance characteristic 22 of the machine 13 to determine whether the machine 13 has fully performed its operation.

Additionally, a comparison between a sensed characteristic of one of the machines 13 and the design performance characteristic 22 of the machine 13 can be used for maintenance purposes. For example, if one of the machines 13 takes a longer amount of time to perform an operation than it should as indicated by its design performance characteristic 22, the control unit 10 can determine that the machine 13 is not operating optimally (i.e. if the amount of time exceeds a design performance characteristic threshold). The control unit 10 can then send out an alert message or failure indicator notifying maintenance workers that its machine 13 may require maintenance. Further, if maintenance is to be performed on one of the machines 13, its control unit 10 can indicate the position of the machine 13 as detected by the location-sensing device 19. Thus, in a large, complex manufacturing plant, a maintenance worker can easily locate the malfunctioning machine.

Once a worker arrives at a malfunctioning machine (or alternately, remotely), the worker can use a personal computer 32 as shown in FIG. 1 to access the LAN, e.g., using a Wi-Fi card, in order to troubleshoot the machine 13. The worker can immediately obtain the BOM 24 and technical drawings 26 for the machine 13. Thus, the maintenance task performed by the worker can be simplified. After work on the machine is complete, the worker may also use the personal computer 32 to enter work completed and identify root cause of failure, or enter work completed for preventive maintenance.

The above-described embodiments have been described in order to allow easy understanding of the invention and do not limit the invention. On the contrary, the invention is intended to cover various modifications and equivalent arrangements, whose scope is to be accorded the broadest interpretation so as to encompass all such modifications and equivalent structure as is permitted under the law.

What is claimed is:

1. A method of controlling operations of a first machine, a second machine, and a third machine of a plurality of machines over a network in an industrial automation environment, each machine being automated machinery that is configured to perform at least one industrial automation operation and having at least a control unit, a sensor and a device, the method comprising:

identifying, using the first machine's control unit, a first prerequisite operating condition associated with the first machine, wherein the first machine is configured to perform at least a first operation only upon meeting the first prerequisite operating condition;

receiving, by the first machine and directly from the second machine over the network and without the use of a central controller, data indicative of at least one current operating condition associated with the second machine, the data indicative of the second machine's at least one current operating condition generated using the second machine's sensor and control unit;

determining, using the first machine's control unit, whether the at least one current operating condition meets the first prerequisite operating condition;

if the at least one current operating condition meets the first prerequisite operating condition, performing the first operation on the first machine using the first machine's device;

if the at least one current operating condition does not meet the first prerequisite operating condition, not performing the first operation on the first machine using the first machine's device;

determining at least one current operating condition associated with the first machine;

generating, using the first machine's sensor and control unit, data indicative of the first machine's at least one current operating condition;

determining a location of the third machine without the use of a central controller; and sending, directly to the third machine at its determined location, the data indicative of the first machine's at least one current operating condition, the first machine's at least one current operating condition useable to determine one of performance and nonperformance of an operation on the third machine.

2. The method of claim 1, further comprising:

determining a sensor output of the first machine's sensor; and generating the first machine's at least one current operating condition based on the sensor output.

3. The method of claim 2, wherein generating the first machine's at least one current operating condition comprises:

comparing the sensor output and at least one design performance characteristic of the first machine; and using the comparison to determine the first machine's at least one current operating condition.

4. The method of claim 1, wherein the first machine is further configured to perform at least a second operation, further comprising:

identifying, using the first machine's control unit, a second prerequisite operating condition associated with the first machine;

if the second prerequisite operating condition is met, performing the second operation on the first machine; and if the second prerequisite operating condition is not met, not performing the second operation on the first machine.

5. The method of claim 4, further comprising:

generating at least one current operating condition associated with the first machine using the at least one sensor of the first machine; and determining if the second prerequisite operating condition is met based on the first machine's at least one current operating condition.

6. The method of claim 4, wherein determining if the second prerequisite operating condition is met comprises:

determining if the second prerequisite operating condition is met by the second machine's at least one current operating condition.

7. The method of claim 1, wherein the method further comprises:
- determining an actual result of the first operation;
- determining a design result of the first operation using at least one design performance characteristic of the first machine;
- determining a difference between the actual result and the design result; and
- if the difference exceeds a predetermined threshold, generating a failure indicator.

8. The method of claim 7, wherein generating the failure indicator comprises:
- determining a location of the first machine;
- wherein the location of the first machine is included in the failure indicator.

9. An apparatus in a first machine for controlling a plurality of machines in an industrial automation environment, each machine being automated machinery that is configured to perform at least one industrial automation operation and having at least a control unit, a sensor and a device, the first machine configured to perform at least a first operation over a network, comprising:
- a memory; and
- a processor configured to execute instructions stored in the memory to:
  - identify a first prerequisite operating condition associated with the first machine, wherein the first machine is configured to perform at least a first operation only upon meeting the first prerequisite operating condition;
  - receive, directly from a second machine of the plurality of machines over the network and without the use of a central controller, data indicative of at least one current operating condition associated with the second machine in the plurality of machines, the data indicative of the second machine's at least one current operating condition generated using the second machine's sensor and control unit; and
  - determine, using the first machine's control unit, whether the at least one current operating condition meets the first prerequisite operating condition;
  - generate a signal to perform the first operation on the first machine if the at least one current operating condition meets the first prerequisite operating condition
  - determine at least one current operating condition associated with the first machine using the first machine's device;
  - generate, using the first machine's sensor and control unit, data indicative of the first machine's at least one current operating condition;
  - determine a location of the third machine without the use of a central controller; and
  - send, directly to at least a third machine of the plurality of machines at its determined location, the data indicative of the first machine's at least one current operating condition, the first machine's at least one current operating condition useable to determine one of performance and nonperformance of an operation on the third machine.

10. The apparatus of claim 9, further comprising:
a location-sensing device configured to sense the location of the first machine.

11. The apparatus of claim 9, wherein the processor is further configured to execute instructions stored in the memory to:
- determine a sensor output of the first' machine's sensor, and
- generate the first machine's at least one current operating condition based on the sensor output.

12. The apparatus of claim 11, wherein the processor is further configured to execute instructions stored in the memory to:
- compare the sensor output and at least one design performance characteristic of the first machine; and
- use the comparison to determine the first machine's at least one operating condition.

13. The apparatus of claim 9, wherein the processor is further configured to execute instructions stored in the memory to:
- identify a second prerequisite operating condition associated with the first machine;
- perform the second operation on the first machine if the second prerequisite operating condition is met; and
- not perform the second operation on the first machine if the second prerequisite operating condition is not met.

* * * * *